(12) United States Patent
Ronnekleiv et al.

(10) Patent No.: US 11,828,631 B2
(45) Date of Patent: Nov. 28, 2023

(54) METHOD AND APPARATUS FOR SUPPRESSION OF NOISE DUE TO LOCAL OSCILLATOR INSTABILITY IN A COHERENT FIBER OPTICAL SENSOR

(71) Applicant: Alcatel Submarine Networks, Nozay (FR)

(72) Inventors: Erlend Ronnekleiv, Trondheim (NO); Ole Henrik Waagaard, Trondheim (NO)

(73) Assignee: Alcatel Submarine Networks, Nozay (FR)

( * ) Notice: Subject to any disclaimer, the term of this patent is extended or adjusted under 35 U.S.C. 154(b) by 273 days.

(21) Appl. No.: 16/911,092

(22) Filed: Jun. 24, 2020

(65) Prior Publication Data
US 2020/0408572 A1    Dec. 31, 2020

(30) Foreign Application Priority Data
Jun. 28, 2019 (EP) .................................... 19305874

(51) Int. Cl.
*G01D 5/353* (2006.01)
*H04B 10/61* (2013.01)

(52) U.S. Cl.
CPC ..... *G01D 5/35358* (2013.01); *G01D 5/35306* (2013.01); *H04B 10/61* (2013.01)

(58) Field of Classification Search
CPC ........... G01D 5/35358; G01D 5/35306; G01D 5/353; H04B 10/61
See application file for complete search history.

(56) References Cited

U.S. PATENT DOCUMENTS

| 9,170,149 B2 | 10/2015 | Hartog et al. |
| 10,247,581 B2 | 4/2019 | Ronnekleiv et al. |
| (Continued) | | |

FOREIGN PATENT DOCUMENTS

| AT | 164276 T | 4/1998 |
| CN | 101917233 A | 12/2010 |
| (Continued) | | |

OTHER PUBLICATIONS

Wu, M., et al, "Phase Noise Compensation for Ultra-highly Sensitive Fiber-optic Quasi-distributed Acoustic Sensing System," 2019 Conference on Lasers and Electro-Optics (CLEO), May 2019, XP033570503, 2 pages.

(Continued)

*Primary Examiner* — Jonathan M Hansen
(74) *Attorney, Agent, or Firm* — Tong, Rea, Bentley & Kim, LLC

(57) ABSTRACT

A method for measuring a response from an optical fiber providing distributed back reflections using a system comprising an optical source comprising a laser, an optical receiver and a processing unit is disclosed. The method comprises generating an interrogation signal and an optical local oscillator using the optical source, the interrogation signal being represented by an interrogation phasor and the optical local oscillator being represented by a local oscillator phasor; transmitting the interrogation signal into the optical fiber; and mixing the optical local oscillator with reflected light from the optical fiber and detecting a mixing product with the optical receiver to achieve a receiver output signal. The method further comprises performing a measurement that characterizes fluctuations in the local oscillator phasor; processing the receiver output signal based on the measurement result to provide a corrected receiver output signal such that an effect of fluctuations in the local oscillator (Continued)

phasor on the corrected receiver output signal is reduced; and applying distributed back-reflection processing on the corrected receiver output signal. Finally, the method comprises extracting the response from the optical fiber from the distributed back-reflection processing output. A system for measuring a response from an optical fiber providing distributed back reflections is also disclosed.

17 Claims, 7 Drawing Sheets

(56) References Cited

U.S. PATENT DOCUMENTS

| | | | | |
|---|---|---|---|---|
| 2010/0014071 | A1* | 1/2010 | Hartog | G01D 5/35361 356/73.1 |
| 2012/0067118 | A1* | 3/2012 | Hartog | G02B 6/10 73/152.16 |
| 2020/0408574 | A1* | 12/2020 | Waagaard | G01D 5/35306 |

FOREIGN PATENT DOCUMENTS

| | | |
|---|---|---|
| CN | 205120239 U | 3/2016 |
| CN | 105490738 A | 4/2016 |
| CN | 205898286 U | 1/2017 |
| CN | 205981438 U | 2/2017 |
| CN | 106537094 A | 3/2017 |
| CN | 108603773 A | 9/2018 |
| CN | 108981890 A | 12/2018 |
| WO | WO 2015/165924 A1 | 11/2015 |

OTHER PUBLICATIONS

Fan, X., et al., "Phase-Noise-Compensated Optical Frequency-Domain Reflectometry," IEEE Journal of Quantum Electronics, vol. 45, No. 6, Jun. 1, 2009, pp. 594-602.

Yang, G., et al., "Distributed Fiber Vibration Sensing Based on Phase Extraction from Phase-sensitive OTDR with Phase Noise Compensation," Asia Communication and Photonics Conference 2015, Nov. 23, 2015, 3 pages.

Zou, W., et al., "Optical pulse compression reflectometry: proposal and proof-of-concept experiment," Optical Society of America, Optics Express, vol. 23, No. 1, Jan. 12, 2015, pp. 512-522.

European Search Report mailed in priority application EP 19 30 5874.0 dated Dec. 16, 2019, 7 pages.

Chinese Office Action mailed in corresponding CN 202010589879.3 dated Nov. 29, 2022, 8 pages.

Wu, M., et al., "Highly sensitive quasi-distributed fiber-optic acoustic sensing system by interrogating a weak reflector array," Optics Letters, Vo. 43, No. 15, Aug. 1, 2018, pp. 3594-3597.

* cited by examiner

METHOD AND APPARATUS FOR SUPPRESSION OF NOISE DUE TO LOCAL OSCILLATOR INSTABILITY IN A COHERENT FIBER OPTICAL SENSOR

CROSS-REFERENCE TO RELATED APPLICATIONS

This application is based on and claims the benefit of European Patent Application No. 19305874.0, filed on Jun. 28, 2019, which is hereby incorporated herein by reference in its entirety.

FIELD OF THE INVENTION

The present invention relates to suppression of source induced noise in a fiber optical sensor system comprising a coherent receiver.

BACKGROUND OF THE INVENTION

Optical fiber sensor systems have been deployed in many different applications due to their general distributed nature. Such systems typically include a narrowband laser source, means of modulating the laser light and detecting the reflected light from a sensor fiber. The reflected light from the fiber may be made either distributed, or quasi-distributed, i.e. in a potentially large number of points along the fiber. Furthermore, several optical fiber sensors can be multiplexed along a single fiber, thus potentially reducing number of fibers and complexity and bulky lead-in cables, etc.

One class of fiber optical sensors systems collects a reflected signal from fiber under test that is inherent to the fiber itself. Particularly, naturally occurring and unavoidable density variations in the fiber gives rise to Rayleigh backscattering. The technique of measuring the changes in the Rayleigh backscattering response along the fiber due to pressure or strain perturbing the fiber is commonly denoted distributed acoustic sensing (DAS). Both the power and phase of the Rayleigh backscattering response are modulated when the fiber is strained. Measuring the phase has an advantage in the linearity of the response as disclosed in U.S. Pat. No. 9,170,149 B2.

One class of quasi-distributed optical fiber sensor systems is based on series of reflectors arranged along one or more fibers in an array. Reflectors may, e.g., be fiber Bragg gratings (FBGs), splices, or other types of fiber perturbations resulting in a reflectance larger than an intrinsic backscatter level along the fiber. Reflected signals from the reflectors may for instance be used in interferometric sensor arrangements to deduce the distance, or the variation in distance to the reflectors, or between sets of reflectors.

Detecting the reflected signal from sensor fiber can be accomplished by direct power measurement of the reflected signal, or coherent optical mixing of the reflected signal by a local oscillator (LO) reference light that originate from the same or another laser source. The coherent approach has the advantage that the optical level can be adjusted by altering the LO power, which gives means of optimizing the signal-to-noise ratio (SNR) of the receiver. In a coherent system the reflected phase is relative to the phase of the local oscillator, and the local strain is computed as the phase difference between two close points on the fiber.

A distributed sensing system may have thousands or even tens of thousands of resolved sensor points/regions along the fiber. The spatial resolution is typically in the range of 0.5-20 m. In order to achieve independent measurements of the sensor channels, the laser light is modulated. There are several ways to modulate the signal to achieve the required spatial resolution. Most commonly is coherent optical time domain reflectometry (c-OTDR), where a modulator generates a short pulse, where the width of the pulse defines the spatial resolution. A new pulse is generated when the reflection response from the whole sensor fiber is received. The disadvantage of the c-OTDR technique is that a duty-cycle of the interrogation signal is directly given by the number of sensor channels, e.g. a system with 1000 sensor channels gives a duty-cycle of only 0.1%.

One way of increasing the duty-cycle is to interrogate with a frequency swept signal. In this case the spatial resolution is not given by the pulse width but rather a bandwidth of the sweep. In this way, the range of the measurement can be extensively expanded compared to c-OTDR. The duty-cycle can even be 100% as disclosed in U.S. Pat. No. 10,247,581 B2.

There are two main contributions to the noise in such systems. Firstly, the shot noise at the receiver dominates for reflected signals from points at the far end of the sensor fiber due to very little reflected light. This noise increases by the propagation loss in the fiber, and ultimately defines the range of the measurement. The second major noise contribution is the source noise of the laser and the modulator, and particularly the frequency noise of the laser. Even though, the source induced noise may be lowered by selecting a narrowband laser such as a fiber distributed feedback laser (DFB), it is still the dominant noise factor at short ranges. In a coherent system, the source noise is present on both the local oscillator signal and the interrogation signal. A method measuring the laser frequency noise and suppression of the noise on the LO signal in a c-OTDR system is presented in [M. Wu, "Highly sensitive quasi-distributed fiber-optic acoustic sensing system by interrogating a weak reflector array", Optics Letters vol. 43, pp 3594]. This system uses Bragg gratings with a separation greater than the pulse width and thereby eliminates the noise contribution from the interrogation signal. The system includes an auxiliary interferometer with an imbalance equal to the delay between the Bragg gratings. The phase of this interferometer is subtracted from the demodulated phase of the Bragg gratings, and thereby eliminating the noise from the local oscillator.

Hence, an improved distributed sensing system comprising measurements of the source noise and utilizing these measurements to suppress the impact on the demodulated sensor signal would be advantageous.

OBJECT OF THE INVENTION

It is an objective of the present innovation to overcome the presented limitations in the prior art. In particular, it is an objective to suppress noise induced by the local oscillator signal on the demodulated signals in a distributed sensing system.

It is a further object of the present invention to provide an alternative to the prior art.

SUMMARY OF THE INVENTION

The above-described object and several other objects are intended to be obtained in a first aspect of the invention by providing a method for measuring a response from an optical fiber providing distributed back reflections using a system comprising an optical source comprising a laser, an optical receiver and a processing unit is disclosed. The method comprises generating an interrogation signal and an optical local oscillator using the optical source, the interrogation signal being represented by an interrogation phasor and the optical local oscillator being represented by a local oscillator phasor; transmitting the interrogation signal into the optical fiber; and mixing the optical local oscillator with reflected light from the optical fiber and detecting a mixing product with the optical receiver to achieve a receiver output signal. The method further comprises performing a measurement that characterizes fluctuations in the local oscillator phasor; processing the receiver output signal based on the measurement result to provide a corrected receiver output signal such that an effect of fluctuations in the local oscillator phasor on the corrected receiver output signal is reduced; and applying distributed back-reflection processing on the corrected receiver output signal. Finally, the method comprises extracting the response from the optical fiber from the distributed back-reflection processing output.

The above-described object and several other objects are also intended to be obtained in another aspect of the invention by providing a system for measuring a response from an optical fiber providing distributed back reflections. The system comprises an optical source comprising a laser, the optical source being configured for generating an interrogation signal and an optical local oscillator, the interrogation signal being representable by an interrogation phasor, and the optical local oscillator being representable by a local oscillator phasor, the optical source further being configured to transmit the interrogation signal into optical fiber. The system also comprising an optical receiver and signal characterization unit configured to generate and receive a mixing product of the optical local oscillator and reflected light from the optical fiber to provide a receiver output signal, and to perform a measurement that characterizes fluctuations in the optical local oscillator. Finally, the system comprises a processing unit configured to process the receiver output signal based on the measurement result to provide a corrected receiver output signal such that an effect of fluctuations in the local oscillator phasor on the corrected receiver output signal is reduced; apply distributed back-reflection processing on the corrected receiver output signal; and extract the response from the optical fiber from the distributed back-reflection processing output.

In some embodiments, the optical source may comprise a narrow bandwidth laser followed by a modulator to modulate the frequency, phase and/or amplitude of the laser output.

In some embodiments, the optical source further comprises an optical amplifier to increase the optical transmitter output power, where the optical amplifier is typically an erbium doped amplifier.

The modulator may be an acousto-optic modulator (AOM), typically limited to about 100 MHz modulation bandwidth. A Dual Mach-Zehnder electrooptical I/Q modulator, typically based on Lithium-Niobate or Indium-Phosphide may be used if larger modulation bandwidths are required. The modulator may also be a Mach-Zehnder electrooptical amplitude modulator, in which case the receiver must be an I/Q receiver (described below).

In some embodiments a tunable or directly modulated laser may replace the narrow bandwidth laser and the modulator.

In embodiments with a frequency swept interrogation signal, the source is modulated with a bandwidth that typically corresponds to the inverse of the wanted delay resolution. For instance, 100 MHz bandwidth corresponds to about 1/100 MHz=10 ns resolution in return delay, which corresponds to a spatial resolution of about 1 m in a standard fiber. In one preferred implementation the modulation comprises frequency sweep with a duration $T_{sw}$ of 110 µs, where the frequency shift changes linearly from 150 to 250 MHz, while the optical power is apodised by a raised cosine in the first 10 µs and the last 10 µs, such that the full width at half maximum is 100 µs. In a system with a measurement range of 50 km, the sweep repetition period is greater or equal to 500 µs, hence the duty-cycle is 20%.

In a c-OTDR system, a short pulse with a duration that determines the spatial resolution is generated by the modulator. In an embodiment, a pulse of width 10 ns is generated to obtain 1 m spatial resolution. With a sweep repetition period of 500 µs, which will allow for 50 km measurement range, the duty-cycle is 0.002%.

The optical field $E_t(t)$ of the transmitted interrogation signal versus time may be expressed as:

$$E_t(t) = \Sigma_n M_n(t-T_n) \cdot e^{i2\pi\nu t}, \qquad (1)$$

where the interrogation phasor $M_n(t)$ represents the modulation that is applied at time offset $T_n$, n is a counter, and $\nu$ is the optical frequency. The interrogation phasor should be designed in such a way that its autocorrelation function has a narrow peak and low sidelobes. For a frequency swept system, the full-width at half maximum (FWHM) of the autocorrelation peak is approximately equal to the inverse modulation bandwidth. Sidelobes will extend in delay to +/− the sweep duration. While for a c-OTDR system, the FWHM of the autocorrelation peak is given by the pulse width, and there is no sidelobes beyond +/− the pulse width. Ideally the modulation may be periodic with a constant repetition period $T_n - T_{n-1} = T_{rep}$, and the interrogation phasor $M_n(t)$ should ideally be independent on n and nonzero only for $0 \leq t \leq T_{rep}$. Note that a multiple of components and noise sources may contribute to the interrogation phasor, such as laser phase and intensity fluctuations, amplifier gain fluctuations, acoustic perturbations of fibers and components inside the instrumentation, in addition to the modulator itself and electrical signal generators and driver electronics providing signals to the modulator. The actual interrogation phasor may therefore deviate from the ideally expected signal, and it may vary with time. It is therefore beneficial to be able to measure the interrogation phasor and modify the drive signal to make that actual interrogation phasor more closely imitate the goal interrogation phasor. This may often be an iterative process of modifying the drive signal and measure the interrogation phasor until an acceptable match with the goal interrogation phasor is achieved.

The source signal is transmitted to an optical circulator or coupler and into a sensor fiber that comprises reflectors such as discrete reflectors and distributed backscatterers. Examples of discrete reflectors are localized fiber Bragg gratings and fiber connectors. Examples of distributed backscatterers are Rayleigh scatterers and fibers with enhanced backscattering by means of distributed or continuous fiber Bragg gratings. Reflected light from reflectors at positions having different delays, corresponding to positions in the sensor fiber, are guided back via the circulator or coupler to a coherent receiver.

The optical field $E_r(t)$ reflected from the sensor fiber is given by a convolution integral $$E_r(t) = \int_0^T h_n(\tau) E_t(t-\tau) d\tau \qquad (2)$$

where $h_n(\tau)$ is the sensor fiber response phasor, representing the magnitude and phase delay of distributed reflectors versus delay $\tau$ in the fiber. $h_n(\tau)$ may be interpreted as the response that would be obtained by probing the sensor fiber with a short Dirac pulse. The response from the individual reflectors may change with time, such that the dynamic response of a reflector at delay $21$ is given by the change of $h_n(\tau_1)$ with n. The sampling rate of the reflector response is $T_{rep}$.

The coherent receiver mixes the reflected light with a local oscillator light with optical field $E_{LO}(t)=M_{LO}(t)\cdot\exp(i2\pi\nu t)$ to produce a beat signal that can be detected by detectors. The receiver output is the output signals from the detector electronics, which is converted to the digital domain by AD converters. Here, $M_{LO}(t)$ represents fluctuations in the local oscillator amplitude and frequency. In one preferred implementation the mixer and detector may comprise a receiver capable of discriminating between positive and negative frequencies, i.e. an I/Q receiver that measures a complex signal comprised by an in-phase (I) and a quadrature (Q) component. An I/Q receiver typically comprises at least two receiver channels, where each receiver channel comprises at least one detector and one AD converter. In a preferred implementation, the receiver channel is a balanced receiver, which comprises two detectors detecting two outputs from the mixer with a phase difference of 180 degrees. The difference between these signals is digitalized by an AD converter (ADC). In this way, optical intensity noise is suppressed, and the range of the ADC is better utilized. The local oscillator and the reflected light may either be overlapping in frequency (homodyne configuration) or separated in frequency (heterodyne configuration). The local oscillator or the reflected light may be shifted in frequency by an optical frequency shifter such that the frequency span of the mixing product satisfies the requirements of the receiver and sampling system. In a heterodyne configuration it is also possible to use a single channel receiver and ADC to obtain an I/Q signal. In this case one may apply a filter to isolate only positive (or only negative) frequencies to produce a complex I/Q signal.

In configurations where a heterodyne setup is combined with an I/Q receiver, it is also possible to use a dual sideband modulator, such as a phase or amplitude modulator driven by a sine signal. One of the sidebands generated in this configuration can then be filtered out to produce a complex I/Q signal.

A coherent receiver is subject to polarization fading that appear when the polarization state of the local oscillator and the reflected light is orthogonal. To eliminate this problem the reflected light can be split between two orthogonal polarization receiver channels, where each polarization channel is detected with a coherent receiver and sampled with ADCs. The two channels may be combined in processing in such a way that the polarization fading is avoided.

The output signal from the receiver may be expressed as $$P(t) = E_{LO}^*(t) \cdot E_r(t) = E_{LO}^*(t) \cdot \int_0^T h_n(\tau) E_t(t-\tau) d\tau \quad (3)$$

$$= M_{LO}^*(t) \cdot \int_0^T h_n(\tau) M_n(t-\tau) d\tau$$

Where T is the nonzero duration of $h_n(\tau)$, i.e. the maximum fiber delay, and superscript * represents complex conjugation. The fiber response $h_n(\tau)$ contains information about the phase and amplitude of reflectors distributed along the sensor fiber, modified by the loss profile of the fiber. In absence of noise and optical nonlinearities, the signal P(t) will be a convolution of the transmitted interrogation phasor $M_n(t)$ and the fiber response $h_n(\tau)$, modified by $M^*_{LO}(t)$. The signal P(t) is sampled using ADCs to produce a sampled signal. The sampled signal is then passed on to a numerical processor for further signal processing. The numerical processor may for instance be a Field-programmable Gate Array (FPGA), Graphics Processing Unit (GPU), Central Processing Unit (CPU), Digital Signal Processor (DSP), or Application-Specific Integrated Circuit (ASIC).

In the second line of eq. (3) the dependence of the optical frequency $\nu$ is cancelled out, such that the output signal will resemble the optical field amplitude at the receiver frequency shifted by the local oscillator frequency. Further frequency shifts can of course be applied as desired, by introducing analog mixing before AD conversion, under-sampling at the AD conversion (effectively mixing with a harmonic of the AD sampling frequency), and/or digital mixing after AD conversion. If under-sampling is used, the minimum required AD sampling frequency equals the optical modulation bandwidth, independent on the offset frequency shift of the modulator. If a single channel (i.e. not I/Q) receiver is used the AD sampling frequency must be at least twice as large to discriminate the negative frequency band from the positive. In some embodiments, it may be beneficial to mix away the frequency offset between the local oscillator and the modulated signal from the sampled signal.

In a preferred implementation, the local oscillator may be formed by splitting off a fraction of the unmodulated laser light. In some cases, it may be desirable to pass the local oscillator light through a frequency shifter to shift the beat signal to a convenient frequency range. It is also possible to use light from a separate light source as the local oscillator, which may then be set to the desired frequency.

The reflection response from the different positions along the fiber can be distinguished by having different delay from the source and back to the receiver. If proper processing is used, the achievable spatial resolution is given by the inverse of the bandwidth of the interrogation signal, and not the duration of the interrogation signal. The sampled receiver output signal should be processed to extract the reflection response at different positions along the fiber with improved spatial resolution and improved signal to noise ratio (SNR). We denote the techniques used to extract the response from the fiber as distributed back-reflection processing.

For a frequency swept signal, where the duration of the pulse is much longer than the inverse of the bandwidth of the interrogation signal, the distributed back-reflection is most often implemented using a pulse compression filter, which should be designed to concentrate the reflected energy from each reflection point in time. This filter should typically resemble the reverse and conjugation of the interrogation phasor.

Those skilled in art would know that a filter can be implemented as a convolution in the time-domain or by converting both signal and filter into the frequency domain using the Fourier transform, multiplying the frequency transformed signal with the frequency transformed filter and converting the result into time-domain again using the inverse Fourier transform.

U.S. Pat. No. 10,247,581 B2 discloses another pulse compression technique that is known as stretch processing. Here, the sampled signal is mixed with a synthetic linear sweep with negative sweep rate of that of the sweep rate of the interrogation phasor. Then, the sensor fiber response can be extracted from the Fourier transform of the mixing product. However, it can be shown that this processing is equivalent to applying a filter with a conjugate and time-reversed version of the linearly swept interrogation phasor. The stretch processing approach is only applicable to linear swept interrogation phasors, and therefore we will only treat the more general filtering approach. However, the techniques described here is also applicable to stretch processing by applying the relationship to the pulse compression filtering approach. This can for instance be implemented by doing an initial stretch processing followed by additional filters describing deviations of the interrogation signal from a linear sweep.

In a c-OTDR system the interrogation signal is a short pulse without frequency sweep, and the spatial resolution is given by the duration of the pulse. However, distributed back-reflection processing is often implemented as a filter that is matched to the interrogation pulse to improve the SNR. The pulse compression filter and the matched filter have similar properties, and the techniques described here is also applicable for matched filtering.

A pulse compression filter with impulse response C(t) is applied to the sampled signal. This filter allows for compression of the interrogation phasor into a short pulse that has a width close to that of the inverse of the total bandwidth of the modulation function, and which we will name the compressed interrogation phasor, defined as $X_n(t)=M_n(t)*C(t)$, where * denote convolution. If noise on the local oscillator is ignored, the output from the pulse compression filter can be written $$S(\tau)=P(\tau)*C(\tau)=h(\tau)*M_n(\tau)*C(\tau)=h(\tau)*X_n(\tau) \qquad (4)$$

The width of the peak at $\tau=0$ and the sidelobes of $X_n(\tau)$ determine the spatial resolution of the distributed measurement and the cross sensitivity between different reflector points. The output from the pulse compression filter will then provide an estimate for the sensor fiber response $h_n(\tau)$. The pulse compression filter may be static, or it may be updated during the measurement such that the responses from different interrogation periods are filtered with different pulse compression filters.

It can be shown that the signal to noise ratio of the demodulated response to a fiber perturbation at a certain point on the fiber may be maximized by setting $C(t)=M*_n*(-\tau)$, in which case the pulse compression filter is called a matched filter. For instance, this may be a valid assumption if the sources of demodulated noise are dominated by uncorrelated white noise on the detector signals, such as thermal noise or shot noise.

In some embodiments, it is desirable to modify the $C(\tau)$ such that it does not completely match $M*_n(-\tau)$. For instance, spectral weighting with smoothly apodized zero phase spectrum may be beneficial to reduce a cross sensitivity between resolved reflection points, i.e. the sidelobes of the compressed interrogation phasor. Some of the embodiments of the inventions involve a filter $g(\tau)$ that applies gain to a transition region of frequency response of the compressed interrogation phasor. It may in some cases be beneficial to reduce the bandwidth of $C(\tau)$ compared to $M_n(\tau)$ such that the maximum gain of $C(\tau)*g(\tau)$ is reduced.

The phase of the pulse compression output $S(\tau)$ represents the optical transmission delay to the respective reflectors along the fiber. This phase, or parameters that depend on this phase, may be extracted from $S(\tau)$ and used to estimate measurands that modulate the propagation delay in the lead fiber, such as strain and refractive index changes. If we define $\phi(\tau)$ as the change in phase of the light returned from a reflector at transmission return delay $\tau$, then the spatial derivative (derivative with respect to $\tau$) of this phase change can be expressed as a linear combination of the change in fiber strain $\varepsilon(\tau)$ and refractive index $\Delta n(\tau)$ at this position, i.e.

$$\frac{d\phi}{d\tau} = 2\pi v(\varepsilon(\tau) + \Delta n(\tau)/n).$$

Here, v is the optical frequency and n is the mean refractive index. The spatial derivative of the time dependent change in reflector phase is therefore a measure for changes in strain and/or refractive index. The demodulated signal can therefore be used to achieve distributed measurements of acoustic vibrations, acoustic pressure, temperature changes, changes in chemical compositions, and so on by making the fiber sensitive to the relevant measurand(s).

Rayleigh backscattering is scattering from density variations at a molecular level and can therefore be model as continuously distributed reflectors with Gaussian distributed real and imaginary parts. The spatial spectrum of the Rayleigh reflectors can therefore be modelled with constant spectral density (i.e. white noise) over a much wider bandwidth than the interrogation signal bandwidth. Consequently, the phase and amplitude of the local reflectors (independent of transmission delay) resolved by an interrogation will vary randomly and nonlinearly, when the interrogation signal is detuned relative to the Rayleigh spectrum. When the fiber is strained, phase delay is added between the individual Rayleigh reflectors. This is equivalent to detuning of the spectrum of the Rayleigh reflectors in the strained section by $-\varepsilon(\tau)v$ (ignoring here the strain induced refractive index change). The phase and amplitude of the local reflectors will therefore also vary randomly and nonlinearly due to strain. This means that the demodulated phase will comprise a nonlinear response to straining of each resolved reflector point in addition to a linear response component caused by changes in the transmission delay between reflector points. Changes in the normalized refractive index $\Delta n(\tau)/n$ causes the same kind of nonlinearity through detuning of the Rayleigh reflectors.

The strain response is often computed as the phase difference between two resolved reflection points that have a distance that is significant longer than the spatial resolution of the reflector point. Then, the phase delay between the reflector points is significantly larger than the nonlinear phase change of the reflector itself, and the relative importance of the nonlinearity of the demodulated phase is significantly reduced. The nonlinear response can be further suppressed by averaging the phase over several resolved (neighboring) reflection points or over measurements in several spectral bands. During such averaging phase responses may be weighted with the reflectivity of the respective reflection points to optimize the signal to noise ratio. Such weighting may also suppress non-linearity further.

Let R(t) be a static reference interrogation phasor that approximately resembles the interrogation phasor $M_n(t)$. Ideally, R(t) could be the expectation value of $M_n(t)$. R(t) may for instance be a measured snap shot of $M_n(t)$, possibly averaged over many repetition periods. In some embodiments, the pulse compression filter may be static and defined as $C(t)=R*(-t)$. This, of course, requires that the output from the receiver has been shifted to the same center frequency as the reference signal. We define the convolution $A(t)=R(t)*C(t)$ as the compressed reference phasor. In cases where $C(t)=R*(t)$, $A(t)$ will be equal to the auto correlation of $R(t)$.

The actual interrogation phasor may be written $M_n(t)=R(t)+\Delta M_n(t)$, such that $\Delta M_n(t)$ represents the deviation of $M_n(t)$ from $R(t)$. $\Delta M_n(t)$ may be partly correlated with $R(t)$ and may vary from repetition period to repetition period and may contribute significantly to the demodulated phase noise. If the distributed back-reflection processing is extended to correct for the effect of $\Delta M_n(t)$ on the demodulated signal, this can greatly improve the SNR of the measurement.

The deviation $\Delta M_n(t)$ may include any noise contribution to the interrogation phasor, however of particular importance is the noise on the estimated fiber response that arises due to amplitude and phase noise from the laser, modulator, amplifiers etc. that effects that local oscillator and the interrogation signal. To evaluate the sensitivity to source noise, we let $\Delta v$ represent a slowly varying detuning of the center frequency of the actual interrogation phasor $M_n(t)$ from $R(t)$. $\Delta v$ is assumed to be constant throughout each sweep but may vary from sweep to sweep. Further fluctuations within a sweep is attributed to a relative deviation $\varepsilon_n(t)=\alpha_n(t)+i\phi_n(t)$, where $\alpha_n(t)$ and $\phi_n(t)$ represent amplitude and phase deviations, respectively. Assuming $|\varepsilon_n(t)| \ll 1$, we may write $$M_n(t)=R(t)e^{i2\pi\Delta vt}(1+\varepsilon_n(t)) \quad (5)$$

As will become apparent below, the detuning $\Delta v$ can be attributed to reflector phasors, such that the deviation of the interrogation phasor due to phase and amplitude noise of the laser becomes $\Delta M_n(t)=\varepsilon_n(t)R(t)$.

Assuming that $M_n$ and $M_{LO}$ originate from the same laser, such that the detuning $\Delta v$ is equal, the local oscillator signal may be written $$M_{LO}(t)=e^{i2\pi\Delta vt}(1+\varepsilon_{LO}(t)) \quad (6)$$

If laser noise dominates over other noise sources contributing to the interrogation phasor, we will have $\varepsilon_n(t) \approx \varepsilon_{LO}(t)$. The output signal in eq. (3) from the receiver then becomes $$P(t) = e^{-i2\pi\Delta vt}(1+\varepsilon_{LO}^*(t)) \cdot \int_0^T h_n(\tau)R(t-\tau) \quad (7)$$
$$e^{i2\pi\Delta v(t-\tau)}(1+\varepsilon_n(t-\tau))d\tau$$
$$= (1+\varepsilon_{LO}^*(t))\int_0^T \left[h_n(\tau)e^{-i2\pi\Delta v\tau}\right]$$
$$R(t-\tau)(1+\varepsilon_n(t-\tau))d\tau$$
$$\approx h'_n(\tau)*R(t) + \varepsilon_{LO}^*(t)[h'_n(t)*R(t)] + (h'_n(t)*[\varepsilon_n(t)R(t)])$$

In the last line we have introduced the modified fiber response $h'_n(\tau)=h_n(\tau)e^{-i2\pi\Delta v\tau}$, and we have ignored terms that are second order in $\varepsilon_{LO}$ and $\varepsilon_n$. The first thing to notice is that the center frequency offset $\Delta v$ introduces a phase change in the modified fiber response that increases linearly with $\tau$, and which therefore is indistinguishable from a constant linear strain of the whole fiber. From the discussion above, there is a non-linear phase response of the resolved reflector points. By other words, $h'_n(\tau)$ is a function of $\Delta v$. This gives rise to an additional noise component in the demodulated phase if $\Delta v$ varies from sweep to sweep.

While the first term in the last line of eq. (7) denotes the noise free contribution, the second and third terms are the contributions from the noise on the local oscillator and the interrogation phasor, respectively. The noise contributions from the local oscillator and the interrogation phasor have different impact on the receiver signal. The local oscillator noise contribution has direct multiplicative impact on the signal. If $\varepsilon_{LO}(t)$ is known, the contribution can be removed by multiplying $P(t)$ with $$\frac{1}{1+\varepsilon_{LO}^*(t)} \approx 1 - \varepsilon_{LO}^*(t).$$

When the local oscillator noise contribution is excluded we find from (7) that the pulse compression filter output (4) can be approximated:

$$S(\tau) \approx h'_n(\tau)*R(\tau)*C(\tau) + h'_n(\tau)*[\varepsilon_n(\tau)R(\tau)]*C(\tau) \quad (8)$$

The noise contribution from the interrogation phasor involves convolution with the fiber impulse response. First, there are noise contributions that vary slowly, and which may be considered constant within the nonzero duration of the interrogation phasor. In this case, $[\varepsilon_n(\tau) R(\tau)]*\varepsilon_n^0 C(\tau) = \varepsilon_n^0[R(\tau)*C(-\tau)]$, where $\varepsilon_n^0$ is assumed constant within sweep n, giving rise to a common phase noise at all delays $\tau$. Such common phase noise will not affect the measured fiber strain or index change, which may typically be calculated by calculating the phase change rate versus T (spatial differentiation) and applying an appropriate scale factor.

To further analyze the contribution from noise fluctuations at shorter timescales, let $\Delta X_n(\tau) = \Delta M_n(\tau) * C(\tau)$ be the deviation of the compressed interrogation phasor $X_n(\tau)$ from the compressed reference phasor $A(\tau)$. Eq. (8) can then be written $$S(\tau)=h'_n(\tau)*(A(\tau)+\Delta X_n(\tau)) \quad (9)$$

Now, assume that a laser has phase noise at a sideband at a frequency offset $f$ from the laser frequency such that $\varepsilon_n(t)=\Sigma_n(f)e^{i2\pi f\tau}$. For cases where the interrogation phasor is a linearly frequency swept pulse and the pulse compression filter is statically defined as $C(\tau)=R*(-\tau)$, it can be shown that $$\Delta X_n(\tau) = \varepsilon_n(f)e^{i\pi f\tau} A\left(\tau + \frac{f}{SWR}\right),$$

which has its maximum at $$\tau = -\frac{f}{SWR}.$$

Eq. (9) now becomes $$S(\tau) = h'_n(\tau)*A(\tau) + h'_n(\tau)*\left[\varepsilon_n(f)A\left(\tau + \frac{f}{SWR}\right)\right] \quad (10)$$
$$= h'_n(\tau)*A(\tau) + \varepsilon_n(f)h'_n\left(\tau - \frac{f}{SWR}\right)*A(\tau).$$

This demonstrates that the sensitivity to noise in the interrogation phasor when demodulating a reflector point at delay $\tau$ is proportional to the (complex) reflectivity at delay $$\tau - \frac{f}{SWR},$$

i.e. at a delay that is separated from the demodulated reflector point by $$\frac{f}{SWR}.$$

Similarly, the demodulation sensitivity to source noise $\epsilon_n(-f)$ at frequency offset $-f$ is proportional to the reflectivity at delay $$\tau + \frac{f}{SWR}.$$

In many cases the spectral density of $\epsilon_n(f)$ will decrease with increasing absolute frequency $|f|$. In such cases the dominating noise contributions will depend mainly on reflection levels at delays close to the demodulated reflectors. A similar dependence on reflectors at various positions will occur for modulations functions that are not linearly swept, however without a direct relation between noise frequency and the delay offset of the contributing reflectors.

If the sensor fiber includes discrete Bragg gratings that are much stronger than the Rayleigh reflections, the delay separation $\Delta\tau_{FBG}$ of the reflectors may typically be longer than the resolution of the interrogation (typically 1/SWR), such that only source noise frequencies at intervals of $\Delta\tau_{FBG}\cdot$SWR contribute to the measured response. This contrasts to measurements of Rayleigh backscattering, which is continuous, such that source noise at all frequencies contribute. Hence, the sensitivity to noise on the interrogation phasor may be greatly reduced for Bragg grating based systems compared to Rayleigh based systems.

The signal to noise ratio can be improved if the pulse compression filter equals $C(\tau)=\hat{M}^*_n(-\tau)$, where $\hat{M}_n(\tau)=(1+\epsilon_n(\tau))R(\tau)$ is an estimate for the actual interrogation phasor $M_n(\tau)$ rather than the static reference $R(\tau)$. Note that the compressed reference phasor $A(\tau)$ is assumed constant although the pulse compression filter may be updated as a function of n. If we ignore second order terms in $\epsilon_n$ the pulse compression output becomes $$S(\tau) = P(\tau) * \hat{M}^*_n(-\tau) \quad (11)$$
$$\approx h'_n(\tau) * (R(\tau) * R^*(-\tau) + \Delta M_n(\tau) *$$
$$R^*(-\tau) + R(\tau) * \Delta M^*_n(-\tau))$$
$$= h'_n(\tau) * (A(\tau) + \Delta X_n(\tau))$$

The deviation from the compressed reference phasor now becomes $\Delta X_n(\tau)=\Delta M_n(\tau)*R^*(-\tau)+R(\tau)*\Delta M^*_n(-\tau)$, where $\Delta M_n(t)=\epsilon_n(\tau)R(\tau)$. For the case with a single side noise sideband $\epsilon_n(t)=\epsilon_n(f) e^{i2\pi f\tau}$ we get $\Delta X_n(\tau)=2\epsilon_n(f)\sin(\pi f\tau)A(\tau+f/SWR)$. For the typical case where $|h'_n(\tau)|\approx|h'_n(\tau-f/SWR)|$ sensitivity to source noise is reduced for $$f < \sqrt{\frac{SWR}{6}}$$

compared to the result in (10) due to the sine term in the expression above. For a 100 MHz sweep with 10 μs duration, this means that the sensitivity to source noise is suppressed for frequencies below 1.3 MHz. For $$f > \sqrt{\frac{SWR}{6}}$$

the rms sensitivity to phase noise of the source is increased with 3 dB on average. However, the impact of colored noise such as $1/f$ laser noise may be significantly reduced by dynamically updating the pulse compression filter with the estimate of the interrogation phasor.

To further reduce the noise sensitivity, a noise suppression filter $T(\tau)$ may be applied to $S(\tau)$. The purpose of this filter is to minimize the effect of $\Delta X_n(\tau)$ on $S(\tau)$. This requires an estimate for $\Delta X_n(\tau)=X_n(\tau)-A(\tau)$. In embodiments like the one described above where $\hat{M}_n(\tau)$ is estimated based on measurements of $\epsilon_n(\tau)$, $X_n(\tau)$ may be estimated as $\hat{M}_n(\tau)*C(\tau)$. In other embodiments a measured estimate for $X_n(\tau)$ may be derived from the back reflection from a discrete reflector superimposed on the sensor fiber, or the response from a separate return path from the instrument transmitter output to a coherent receiver. The noise suppression filter is preferably a finite impulse response (FIR) filter, but in principle an infinite impulse response (IIR) filter may be used. The noise suppression filter may be convolved with the original pulse compression filter to form a combined filter $T(\tau)*C(\tau)$ or it may be applied separately. The response after applying the noise suppression filter to eq. (9) can be written in the frequency domain as $S(f)\cdot T(f)=H(f)\cdot(A(f)+\Delta X_n(f))\cdot T(f)$, where $H(f)$, $A(f)$, $\Delta X_n(f)$ and $T(f)$ are the Fourier transforms of $h'(\tau)$, $A(\tau)$, $\Delta X_n(\tau)$ and $T(\tau)$, respectively. The optimum noise suppression filter is such that $H(f)(A(f)+\Delta X_n(f))\cdot T(f)=H(f)\cdot A(f)$. This gives $$T(f) = \frac{A(f)}{(A(f) + \Delta X_n(f))} = \frac{1}{\left(1 + A^{-1}(f) \cdot \Delta X_n(f)\right)} \quad (12)$$
$$= 1 - A^{-1}(f) \cdot \Delta X_n(f) + \left(A^{-1}(f) \cdot \Delta X_n(f)\right)^2 -$$

Where the fraction is expanded into a power series. In most cases we may assume that $\|\Delta X_n(\tau f)\| \ll 1$, where $\|\cdot\|$ denotes root-mean-square, such that good noise suppression can be achieved by only considering the two first terms of the power series. In the delay domain we may then write $T(\tau)=\delta(\tau)-\Delta X_n(\tau)*g(\tau)$, where $g(\tau)$ is a filter approximating the inverse filter of $A(\tau)$. In practice, the noise suppression filter may be implemented by subtracting $S(\tau)*\Delta X_n(\tau)*g(\tau)$ from the pulse compression filter output $S(\tau)$. This gives, $$S'(\tau) = h'_n(\tau) * (A(\tau) + \Delta X_n(\tau)) * T(\tau) \quad (13)$$
$$= h'_n(\tau) * (A(\tau) + \Delta X_n(\tau)) * (\delta(\tau) - \Delta X_n(\tau) * g(\tau))$$
$$= h'_n(\tau) * [A(\tau) + (\delta(\tau) - A(\tau) * g(\tau)) * \Delta X_n(\tau) -$$
$$\Delta X_n(\tau) * g(\tau) * \Delta X_n(\tau)]$$

The term $(\delta(\tau)-A(\tau)*g(\tau))$ determines the source noise sensitivity dominant to first order in $\Delta X_n(\tau)$. If $g(\tau)$ is chosen such that $\|\delta(\tau)-A(\tau)*g(\tau)\| \ll 1$, the source noise sensitivity is significantly reduced. Note that $A(\tau)$ may be truncated in this calculation to a relatively short duration in r, since $A(\tau)$ decays asymptotically as $$\frac{1}{|\tau|^m},$$

where m≥1 depends on die apodization of the interrogation phasor.

The impulse response of $g(\tau)$ may be chosen such that $A(\tau)*g(\tau)=\delta(\tau)$, which means that $g(\tau)$ is an inverse filter of $A(\tau)$, in which case the first order contributions in $\Delta X_n(\tau)$ are completely suppressed from eq. (13). This means that $g(\tau)$ compensates for variations in the pass band and applies gain to the transition and stop band of the spectrum of $A(\tau)$, in addition to correcting for phase deviations between the spectrum of $R(\tau)$ and $C(\tau)$. Note that if $C(\tau)=R^*(-\tau)$ and we denote $R(f)$ as the spectrum of $R(\tau)$, the spectrum of $A(\tau)$ equals $A(f)=R(f)\cdot C(f)=|R(f)|^2$, which has zero phase. An exact inverse of $A(\tau)$ does not in general exist as a stable function. However, a suitable inverse filter $g(\tau)$ can be found by minimizing the norm $\|\delta(\tau)-A(\tau)*g(\tau)\|$. Several such optimization techniques exist, e.g. that optimize the coefficients of a FIR filter of a given length. One way to construct this filter is to notice that if $\|\delta(\tau)-A(\tau)*g(\tau)\|<c$ for $|c|<1$, then $\|[\delta(\tau)-A(\tau)*g(\tau)]*[\delta(\tau)-A(\tau)*g(\tau)]\|<c^2$. Using this relation, an improved inverse filter can be computed as $g(\tau)*(2\delta(\tau)-A(\tau)*g(\tau))$. An optimum solution for $g(\tau)$ can therefore be computed recursively starting with $g(\tau)=\delta(\tau)$.

In the discussion above the noise suppression filter is computed by neglecting the quadratic term in $\Delta X_n(\tau)$ in eq. (13). If higher order terms of $\Delta X_n(\tau)$ become dominant, additional power terms in eq. (12) may be included in $T(\tau)$. If more than 2 or 3 orders in $\Delta X_n(\tau)$ need to be included in the computation of $T(\tau)$, it may be computational beneficial to use a more general approach for computing $T(\tau)$ such that $\|X_n(\tau)*T(\tau)-A(\tau)\|$ is minimized. Many such techniques exist, and the use of the conjugate gradient method may be particularly computational efficient.

To conclude the above discussion, the pulse compression filter can be modified in the following ways to suppress the sensitivity to source induced noise; 1) updating the pulse compression filter to resemble an estimate $\hat{M}_n(\tau)$ of the actual interrogation phasor such that $C(\tau)=\hat{M}_n(-\tau)$, 2) applying a noise suppression filter to the original pulse compression filter $C_0(\tau)$, such that $C(\tau)=C_0(\tau)*T(\tau)$, or combination a combination of 1) and 2) such that $C(\tau)=\hat{M}^*_n(-\tau)*T(\tau)$.

Noise suppression filters may be computed separately for different noise sources and applied successively or as a combined filter. This is particularly useful with separate measurement of the laser noise phasor (phase and magnitude) and the interrogation phasor, i.e. the optical phasor after the modulator. An interrogation phasor may first be calculated by multiplying the reference interrogation phasor with the measured laser noise phasor. This interrogation phasor may then be the basis for the initial pulse compression filter and the first noise suppression filter.

These filters may be applied to the measurement of the interrogation phasor, and the resulting $\Delta X_n(\tau)$ may be used to compute a second noise suppression filter. Both the first and the second noise suppression filter should be applied to the measured fiber response.

The discussion above also showed that there is noise related to slow variations in $\Delta\nu$, typically on time scales longer than the repetition period $T_{rep}$. Excluding the other noise sources, the output from the pulse compression filter is given in the frequency domain as $S(f)=H(f-\Delta\nu)\cdot A(f)$ rather than the expected response $H(f)\cdot A(f)$. Here, $S(f)$, $H(f)$ and $A(f)$ are the Fourier transforms of $S(\tau)$, $H(\tau)$ and $A(\tau)$ respectively. If $\Delta\nu$ is known, this can be compensated by computing the corrected response $$S'(f) = S(f+\Delta\nu)\cdot \frac{A(f)}{A(f+\Delta\nu)} = H(f)\cdot A(f).$$

The value of $\Delta\nu$ can for instance be estimated from on the overall (or average) apparent demodulated strain of the fiber by assuming that the overall actual strain remains constant. In many cases, $A(f)$ has a flat response except at edges of the spectrum. Thus, the spectral shape of $$\frac{A(f)}{A(f+\Delta\nu)}$$

comprises a gain in the transition region at one end of the spectrum and attenuation at the other end. In the delay domain, the corrected response may be calculated as $$S'(\tau) = \left[e^{-i2\pi\Delta\nu\tau}(S(\tau)*g(\tau))\right]*A(\tau) \quad (14)$$
$$= e^{-i2\pi\Delta\nu\tau}\left(S(\tau)*g(\tau)*\left[e^{i2\pi\Delta\nu\tau}A(\tau)\right]\right)$$
$$= e^{-i2\pi\Delta\nu\tau}(S(\tau)*g'(\tau))$$

where $g(\tau)$ is used as an approximation for the inverse of $A(\tau)$, and $g'(\tau)=g(\tau)*[e^{i2\pi\Delta\nu\tau}A(\tau)]$ is a detuning compensation filter. Thus, eq. (14) comprises flattening of the spectral magnitude of $S(\tau)$ with $g(\tau)$, frequency shifting the result with $\Delta\nu$, and a second shaping of the response with $A(\tau)$. Since $S(\tau)=P(\tau)*C(\tau)$, it may be numerically beneficial to compute $S(\tau)*g(\tau)$ as $P(\tau)*C_g(\tau)$, where $C_g(\tau)=C(\tau)*g(\tau)$, to avoid that the frequency regions that are attenuated by applying $C(\tau)$ is followed by scaling up the same frequency region by $g(\tau)$. In many cases $\Delta\nu$ will be much smaller than the inverse of the spatial resolution. We may then assume $e^{i2\pi\Delta\nu\tau}\approx 1+i2\pi\Delta\nu\tau$ and $g(\tau)*A(\tau)\approx\delta(\tau)$, such that the detuning compensation filter can be approximated to $g'(\tau)\approx\delta(\tau)+\Delta\nu\cdot\hat{g}(\tau)$, where $\hat{g}(\tau)=i2\pi[\tau A(\tau)]*g(\tau)$. This allows for implementing eq. (14) according to $$S'(\tau)=e-e^{i2\pi\Delta\nu\tau}[S(\tau)+\Delta\nu(S(\tau)*\hat{g}(\tau))], \quad (15)$$

The first factor in eq. (15) gives a linear contribution $2\pi\Delta\nu\tau$ to the phase of $S'(\tau)$. This term can be removed by mixing, or the linear phase term can be subtracted from the demodulated reflector phase. The term $\Delta\nu(S(\tau)*\hat{g}(\tau))$ compensates for the non-linear contribution to the phase of $S'(\tau)$. In analogy with the discussion above, this term may be computed as $\Delta\nu\,(P(\tau)*C_{\hat{g}}(\tau))$, where $C_{\hat{g}}(\tau)=C(\tau)*\hat{g}(\tau)$. The approximation of the detuning compensation filter can be made more accurate by expanding $e^{i2\pi\Delta\nu\tau}$ to higher order terms, e.g. the second order contribution can be computed as $\Delta\nu^2(S(\tau)*\hat{g}_2(\tau))$, where $\hat{g}_2(\tau)=-4\pi[\tau^2 A(\tau)]*g(\tau)$. If the laser frequency can be tuned, it can be beneficial to apply feedback from the measured deviation $\Delta\nu$ to the laser to avoid large frequency changes from accumulating.

In cases where the laser frequency is allowed to drift over frequency spans that are significant in magnitude compared to the sweep bandwidth the transmitted signal spectrum may not properly cover the full spectrum of $A(f)$, and consequently the signal-to-noise ratio of $S'(\tau)$ as defined in eq. (14) will degrade. Noise related to nonlinear response to detuning can may still be suppressed by correcting for the change in detuning between each repetition period. Let $\Delta^2\nu$ be the change in laser detuning from repetition period $n-1$ to $n$. Furthermore, let $\Delta\phi(\tau)$ be the change in the phase of the fiber response (distributed reflector phase) in the same time interval if laser frequency remains unchanged, i.e. for $\Delta^2\nu=0$. We may assume that only a phase change of the fiber response such that we may write $h_n(\tau)=e^{i\Delta\phi(\tau)}h_{n-1}(\tau)$. The modified fiber response introduced in eq. (7), which includes the effect of laser detuning, can be written $h'_n(\tau)=e^{i\Delta\phi'(\tau)}h'_{n-1}(\tau)$, where $\Delta\phi'(\tau)=\Delta\phi(\tau)+2\pi\Delta^2\nu\tau$ is the combined phase change due to change in fiber response and laser detuning. Inserting $h'_n(\tau)$ into eq. (9) with $\Delta X_n(\tau)=0$ we get $$S_n(\tau)=h'_n(\tau)*A(\tau)=\int e^{i\Delta\phi'(\tau-t)}h'_{n-1}(\tau-t)A(t)dt, \quad (16)$$

The phase term $\Delta\phi'(\tau-t)$ can be approximated with a Taylor expansion $$\Delta\phi'(\tau-t) = \Delta\phi'(\tau) - \frac{d\Delta\phi'(t)}{dt}\bigg|_{t=\tau}t \quad (17)$$
$$= \Delta\phi(\tau) + 2\pi\Delta^2\nu\tau - 2\pi\Delta^2\nu t - \frac{d\Delta\phi(\tau)}{d\tau}t$$

In many cases it is a good approximation to assume that $\Delta\phi(\tau)$ is constant within the spatial width of $A(\tau)$, in which case that the latter term in eq. (17) can be assumed to be zero. Remembering that $A(\tau)*g(\tau)\approx(\tau)$, eq. (16) may then be written $$S_n(\tau) = e^{i(\Delta\phi(\tau)+2\pi\Delta^2\nu\tau)}\left([h'_{n-1}(\tau)]*\left[e^{-i2\pi\Delta^2\nu t}A(t)\right]_{t=\tau}\right) \quad (18)$$
$$= e^{i(\Delta\phi(\tau)+2\pi\Delta^2\nu\tau)}([h'_{n-1}(\tau)*A(\tau)]*g(\tau)*$$
$$\left[e^{-i2\pi\Delta^2\nu\tau}A(\tau)\right])$$
$$= e^{i\Delta\phi(\tau)}S'_{n-1}(\tau),$$

where $$S'_{n-1}(\tau) = e^{i2\pi\Delta^2\nu\tau}\left(S_{n-1}(\tau)*g(\tau)*\left[e^{-i2\pi\Delta^2\nu\tau}A(\tau)\right]\right) \quad (19)$$
$$\approx e^{i2\pi\Delta^2\nu\tau}(S_{n-1}(\tau) - \Delta^2\nu(S_{n-1}(\tau)*\hat{g}(\tau)))$$

is the modification of $S_{n-1}(\tau)$ due to the change $\Delta^2\nu$ in detuning from interrogation period $n-1$ to $n$. The approximation in eq. (19) is valid for $2\pi\Delta^2\nu\tau\ll1$, and may be derived with the same technique that was used for the transition from eq. (14) to eq. (15).

From eq. (18) we see that $\Delta\phi(\tau)$ can be computed as $$\Delta\phi(\tau)=\angle[S_n(\tau)S'^*_{n-1}(\tau)] \quad (20)$$

where $\angle$ computes the angle of the argument. The reflector phase independent on laser detuning may then be found by accumulating $\Delta\phi(\tau)$ over the repetition periods.

For interrogation of Rayleigh backscattering the phase response to fiber strain is not linear, and the nonlinearity varies randomly between the resolved reflection points, as discussed earlier. A uniform strain applied to the fiber and a change in the center frequency of the laser will contribute equally to change in the demodulated phase. This means that the same technique as described here for suppression of noise due to detuning of the laser frequency can be adopted to suppress the nonlinearity in the strain response. We may calculate a first estimate for the local detuning, defined as the local difference between the spectral shift of the resolved reflector and that of the interrogation phasor, as $$\Delta\nu_{loc}(\tau) = \frac{1}{2\pi}\frac{d\phi'(\tau)}{d\tau} = \Delta\nu + (\varepsilon(\tau) + \Delta n(\tau)/n)\nu.$$

Then eq. (14) may be used to suppress the non-linear component in the strain response. The contribution to local detuning from strain or index shift can often be large compared to the sweep bandwidth. For instance, a fiber strain amplitude of 1 μStrain will cause a local detuning amplitude of about 150 MHz when interrogating near $\nu=193$ THz (1550 nm). A change in local detuning induced by strain or index shift will have the effect that $$\frac{d\Delta\phi(\tau)}{d\tau} \neq 0,$$

and the change in local detuning between repetition period $n-1$ and $n$ is defined as $$\Delta^2\nu_{loc}(\tau) = \frac{d}{2\pi d\tau}\Delta\phi'(\tau) = \Delta^2\nu + \frac{d\Delta\phi(\tau)}{2\pi d\tau} \quad (21)$$

The change in laser detuning $\Delta^2\nu$ in the first line of eq. (20) may now be replaced by the local detuning of eq. (21). However, the term $[e^{-i2\pi66^2\nu(\tau)t}(*A(t)]$ is now no longer invariant to $r$, so the filter involved in calculating $S'_{n-1}(\tau)$ from $S_{n-1}(\tau)$ must be updated for each value of $\tau$. If we assume $2\pi\Delta^2\nu(\tau)\tau\ll1$ we may use the same type of approximation as in the second line of (19) to get $$S'_{n-1}(\tau)\approx e^{i2\pi66^2\nu(\tau)t}(S_{n-1}(\tau)-\Delta^2\nu_{loc}(\tau)(S_{n-1}(\tau)*\hat{g}(\tau))) \quad (22)$$

The filter $\hat{g}(\tau)$ applied to $S_{n-1}(\tau)$ is a static filter independent of $\Delta^2\nu_{loc}(\tau)$. The change in reflector response can be computed from eq. (20).

Since $\Delta^2\nu(\tau)$ in eq. (21) depends on the spatial derivative of $\Delta\phi'(\tau)$, it will not be known exactly until $\Delta\phi(\tau)$ is computed from eq. (22). A first estimate for the local detuning may however be computed for each repetition period as $$\Delta^2\nu_{loc}(\tau) = \frac{d}{2\pi d\tau}\Delta\phi'(\tau) \approx \frac{d}{2\pi d\tau}\angle[S_n(\tau)S^*_{n-1}(\tau)].$$

Extrapolation of previous time samples of $\Delta^2\nu(\tau)$ can also be used as the first estimate, for instance by employing a Kalman filter. Starting with the first estimate for $\Delta^2\nu_{loc}(\tau)$ the computation steps of eq. (21) and eq. (22) may be repeated multiple times to achieve improved estimate of $\Delta^2\nu_{loc}(\tau)$ in each iteration.

From the above discussion it is desirable to be able to optimize the pulse compression filter $C(t)$ based on some knowledge about $M_n(t)$. In a preferred implementation of the invention $M_n(t)$ is therefore measured with a coherent receiver. In cases where the deviations in $M_n(t)$ varies between the repetition periods, both the phase and amplitude of the compressed interrogation phasor peak and its sidelobes will also fluctuate, and these fluctuations may lead to increased noise in the demodulated signal. Separate measurements of $M_n(t)$ in each repetition period may be preferable to enable suppression of this kind of noise

DETAILED DESCRIPTION

Figure 1:
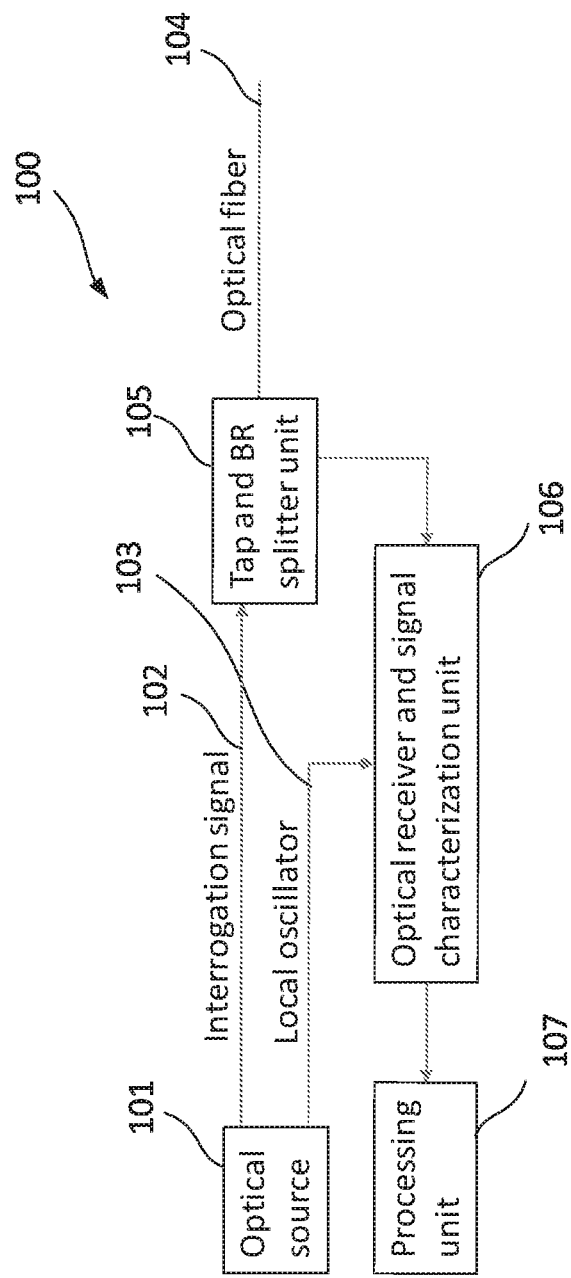
FIG. 1 illustrates a system according to the invention.

FIG. 1 illustrates a system 100 according to the invention, the system comprising an optical source 101 providing an interrogation signal 102 and an optical local oscillator 103. The optical local oscillator is directed to an optical receiver and signal characterization unit 106. The interrogation signal is being launched into the optical fiber 104 (called "sensor fiber" in the following) via a tap and backreflection unit 105. Note that the term "sensor fiber" here merely means the fiber to be interrogated, not necessarily that the fiber contains or forms sensors as such. For instance, in some embodiments, the sensor fiber may be a regular optical fiber, such as an SMF-28-type fiber. The interrogation signal 102 launched into the sensor fiber 104 will be reflected from different sections of the sensor fiber and directed to the optical receiver and signal characterization unit 106 via the tap and backreflection unit 105. The optical receiver and signal characterization unit 106 mixes the reflected light with the optical local oscillator and performs measurements of fluctuations in the local oscillator signal and/or the interrogation signal. The optical receiver and signal characterization unit 106 provides input for a processing unit 107 for further signal processing.

Alternative implementations of the system according to the invention, and measurement of $M_n(t)$ are illustrated in FIGS. 2A-D. Throughout the figures, like reference numerals refer to the same or corresponding parts. Therefore, only differences of one embodiment in comparison with previous embodiments will be discussed.

As mentioned above, laser noise may contribute to errors in the interrogation phasor $M_n(t)$. Such noise may also contribute to local oscillator phase noise. In many cases the laser noise will be dominated by phase noise, while the intensity noise from the laser will be negligible.

To suppress laser induced noise an auxiliary laser frequency monitoring interferometer may be included. The output from this interferometer may be sampled and used in the pulse compression filter processing to suppress the noise contribution from the laser. Such an interferometer may for instance be implemented by leading part of the laser light to a fiber Michelson interferometer with Faraday reflectors (to suppress polarization fading) that is locked into quadrature at low frequencies, typically below the inverse repetition period. The monitoring interferometer can provide a measure for laser frequency fluctuations, which may be integrated with time to obtain the laser phase fluctuations.

Other interferometer topologies than the Michelson design may also be used, such as Mach-Zehnder or Fabry-Perot. As an alternative to quadrature locking, the interferometer may be designed to allow for direct I/Q demodulation of the interferometer phase, for instance by use of a 3×3 coupler, an optical hybrid or by generating a phase generated carrier by either modulating the light passed to the interferometer or placing a modulator inside the interferometer.

The Pound-Drever-Hall (PDH) technique is a sensitive method to measure the phase noise of a laser which can be used to suppress phase noise through feedback to the laser. The PDH error signal can also be sampled and feedforward to the pulse compression filter processing for further suppression of laser phase noise.

Optionally, laser intensity noise may also be monitored, for instance by leading a fraction of the laser light to a separate intensity monitoring detector.

Figure 2:
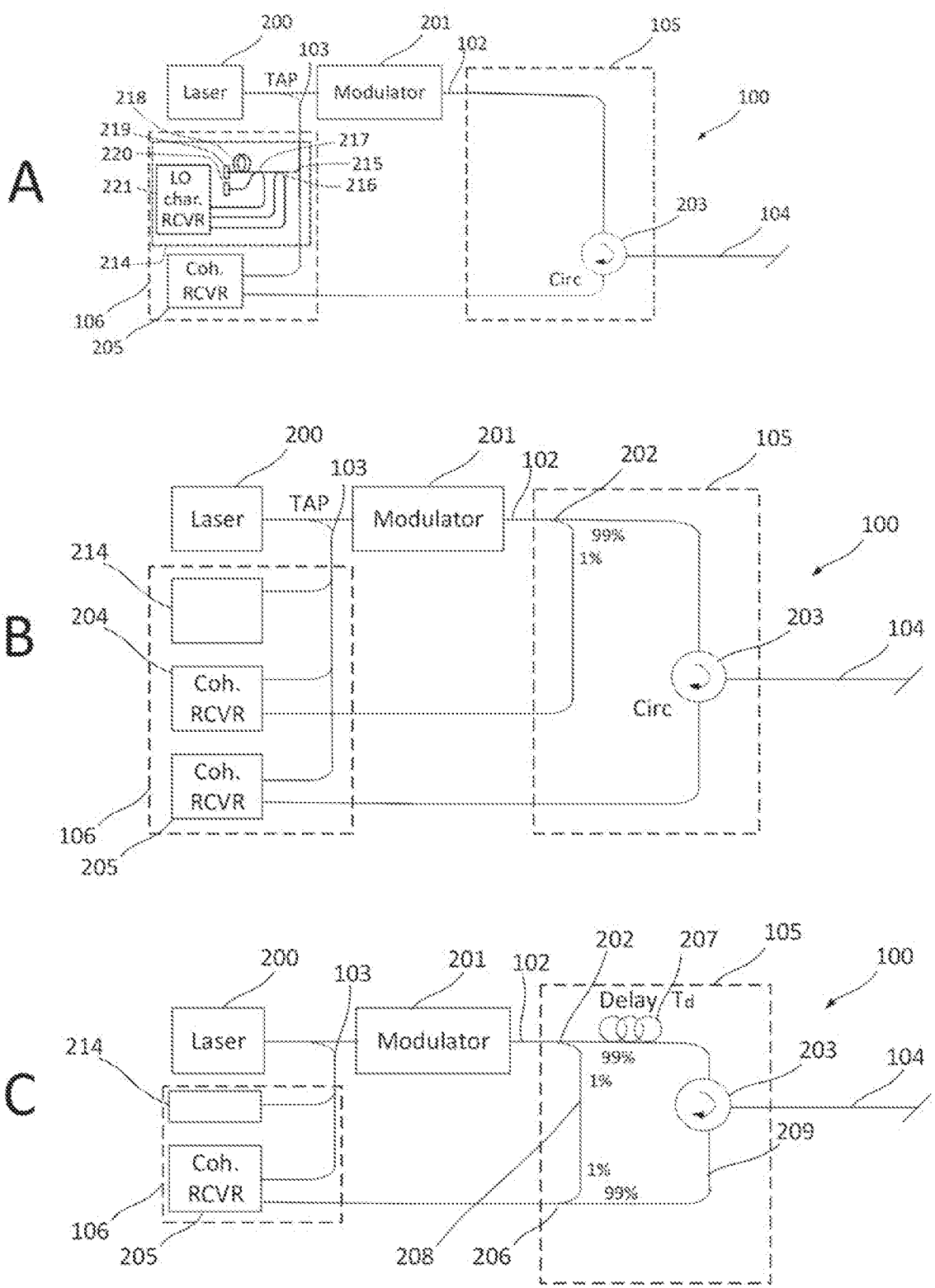
FIG. 2 A-E show alternative implementations of the measurement of $M_n(t)$.
Figure 2:
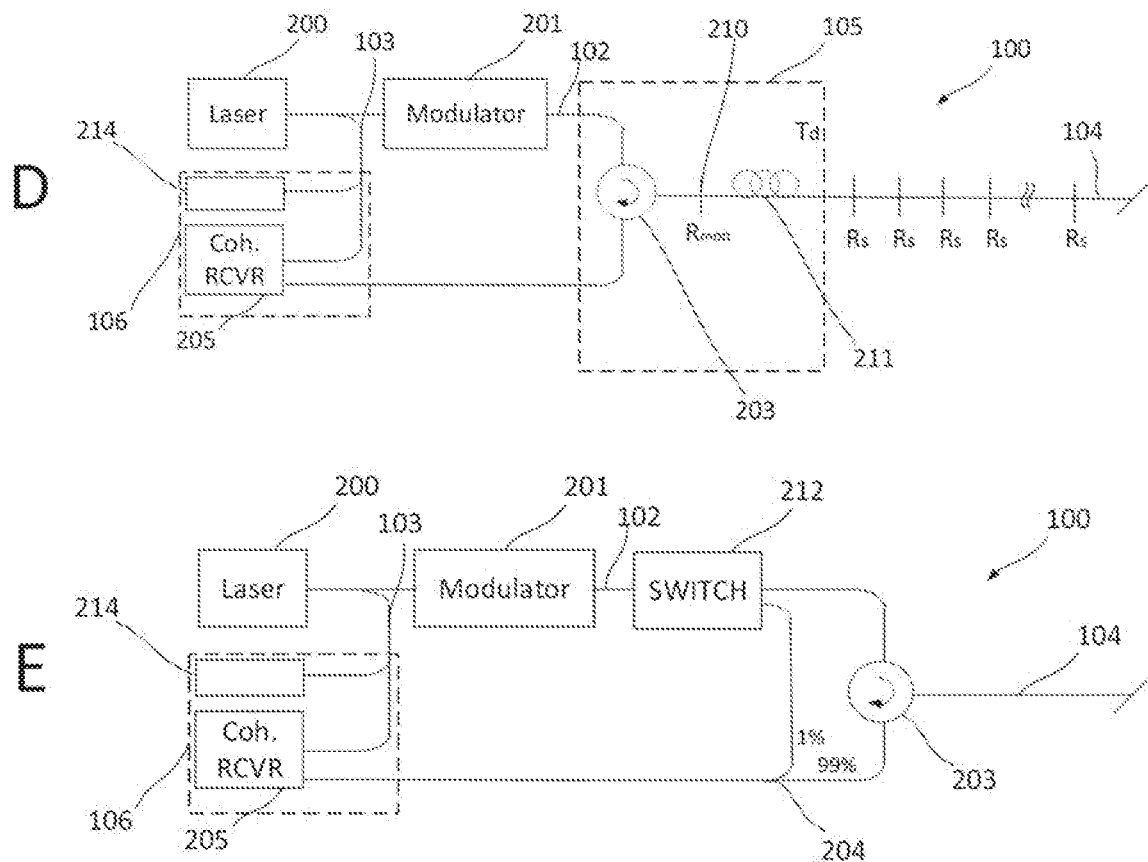

FIG. 2A illustrates the optical source 101 as a laser 200 and modulator 201. The tap and backreflection unit 105 comprises a circulator 203 and the tap coupler 202. The optical receiver and signal characterization unit 106 comprises a coherent receiver 205 to detect the reflected signal from the sensor fiber and a laser monitor 214. The laser monitor 214 comprises a coupler 215 is used to guide a fraction, for instance 20%, of the laser output via coupler 216 to a Michelson interferometer comprised by coupler 217, for instance a 50% coupler, a delay fiber 218, for instance with 100 ns return delay, and two Faraday mirrors 219 and 220. The local oscillator is derived from the laser output such that the measurement of the local oscillator gives a measurement of laser noise. Coupler 216 may for instance be a 30% coupler configured such that 30% of the input power is guided to the Michelson interferometer. The return signals from the Michelson interferometer are guided from coupler 217 to the upper and (via coupler 216) the lower input of the local oscillator characterization receiver 221. By scaling the two resulting detector signals such that they provide approximately equal fringe amplitudes and taking the difference, one obtains a signal that is a sine function of the optical frequency of the local oscillator, or more precisely a sine function of the local oscillator phase change (Mt) within the dual path delay of the delay fiber 218 given by $A\sin(\phi_n(t)-\phi_n(t-\tau_{IF}))\approx A(\phi_n(t)-\phi_n(t-\tau_{IF}))$, where A is scale factor and $1/\tau_{IF}$ is the imbalance of the interferometer. The response is proportional to frequency noise of the laser at frequencies $\ll 1/\tau_{IF}$, but falls off to a zero at $1/\tau_{IF}$. The local oscillator phase can be computed by scaling by $1/A$ and applying an integrator. This integrator should be bandlimited to cut-off at low frequencies and at a frequency below $1/\tau_{IF}$. If this signal is fed back to a mechanism that modulates the source laser frequency, for instance a laser pump current, one may stabilize the laser frequency, while the interferometer is kept close to quadrature, i.e. close to the zero crossing of the mentioned sine function. Alternatively, the interferometer may be kept in quadrature by applying feedback to a mechanism that modulates the delay of the delay coil, for instance via a Peltier temperature modulator. Intensity fluctuations in the local oscillator signal may be monitored by detecting the middle input to the local oscillator characterization receiver via the lower left output of coupler 216. In this way, signals that characterize both the phase and the amplitude fluctuations of the local oscillator signal are made available. These signals could be sampled by some signal characterization ADCs to provide a measurement of fluctuations in $M_{LO}(t)$ which could be used to remove the effect of local oscillator induced noise from the signals received from the coherent receiver 205. If the interrogation signal is derived from the same laser output as the local oscillator, which is the case in the example illustrated in FIG. 2B, the output from the signal characterization ADCs may be used to estimate for both the noise in $M_n(t)$ and $M_{LO}(t)$, providing the possibility to suppress the effect of both noise sources. This is exemplified above in equation (7) and the following discussions.

In FIG. 2B a tap coupler 202 is used to guide a fraction, for instance 1%, of the transmitted light to a separate coherent receiver 204 which will provide an updated monitor measurement of $M_n(t)$ for every repetition period n.

FIG. 2C illustrates that two weak couplers called Tap 202 and Combiner 206 and a delay fiber 207 are arranged in front of the circulator 203, which may define the start of the sensor fiber, in such a way that a fraction of the transmitted light passes through a monitor arm 208 and reaches the receiver before the light reflected from the sensor arm 209. In one preferred implementation of the invention $M_n(t)$ is nonzero in only a part of each repetition period $T_{rep}$, and the first sensor reflections are delayed by $T_d$, which is longer than the nonzero duration of $M_n(t)$. In this way, the full duration of $M_n(t)$ can be measured before the sensor reflections enter the receiver 106, thus avoiding interference with the sensor reflections.

In an alternative implementation the delay $T_d$ can be shorter, and the nonzero duration of $M_n(t)$ may even be close or equal to $T_{rep}$. Such implementations may for instance be useful in cases where $M_n(t)$ is a frequency sweep with sweep rate SWR (Hz/s). If the instantaneous frequency of $M_n(t)$ (the phase change rate) deviates from R(t) with less than SWR·$T_d$, the compressed interrogation phasor will only fluctuate significantly in the delay range $[-T_d, T_d]$. In that case, the deviations in $M_n(t)$ can be computed from the pulse compression filter output in the delay range$\pm T_d$ centered around the monitor delay. Such monitoring can be useful in cases where suppression of noise arising from low frequency deviations in $M_n(t)$ is important.

FIG. 2D illustrates the use of a discrete monitor reflector $R_{mon}$ 210 in the sensor fiber with a reflectivity that significantly exceeds the combined Rayleigh backscattering strength of the sensor fiber within a delay range $T_d$, may provide a monitor signal at the receiver 106 that dominates clearly above the Rayleigh scattering, and which can be used to monitor fluctuations in a swept signal $M_n(t)$ at frequencies<SWR·$T_d$. The reflector 210 may for instance be formed by a fiber Bragg grating (FBG), a reflective splice or a connector. Due to the very high amplitude difference between the monitor signal and Rayleigh scattered signals, the receiver will need a very high dynamic range to allow the Rayleigh scattering signal, and thus the sensor phase information, to be extracted. However, if the sensor part of the fiber comprises sensor reflectors $R_s$ that are comparable in strength to the monitor reflector $R_{mon}$, such as FBGs, the dynamic range requirement on the receiver will be relieved. In this case, by delaying the first sensor reflector with $T_d$ relative to the monitor reflector, e.g. with a delay fiber 211, it will be possible to monitor fluctuations in a swept signal $M_n(t)$ at frequencies <SWR·$T_d$. Note that $T_d$ in this case is the dual path delay of the fiber between the two reflectors, as opposed to FIG. 2B where $T_d$ is the combined single path delay of the fiber from the Tap 202 to the circulator 203 and from the circulator 203 to the combiner 206, minus the delay of the direct path from the Tap 202 to the Combiner 206.

FIG. 2E illustrates a technique useful in connection with the present invention, in which an optical switch 212 selectively allows the signal that otherwise is transmitted to the sensor fiber 104 to be routed directly to the receiver 106, to measure the shape of $M_n(t)$ for a short period before the interrogation starts. The measurements may be averaged over several repetition periods, to get an estimate $M_n(t)$ for the typical shape of $M_n(t)$. This measurement may provide a basis for the reference interrogation signal $R(\tau)$. The deviation between estimate of the estimated interrogation phasor and a goal interrogation phasor may be used to compute a premphasis on the drive signal to the modulator to minimize this deviation.

Figure 3:
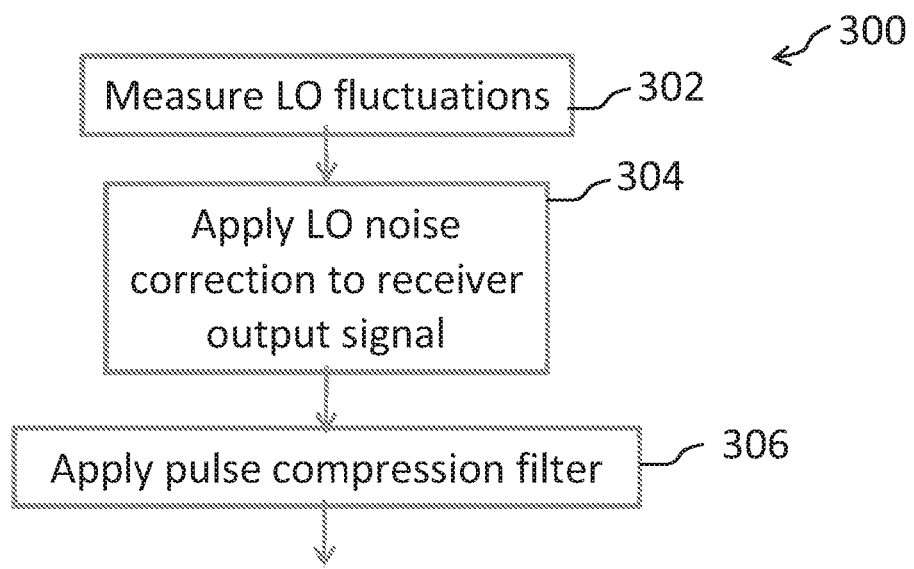
FIG. 3 shows a flow diagram of an embodiment of the method according to the invention.

FIG. 3 illustrates an embodiment of the method 300 according to the invention, for compensating for fluctuations in the optical local oscillator. In a first step 302, the fluctuations in the local oscillator signal is measured according to the embodiment in FIG. 2A. The embodiment in FIG. 2A provides a measured laser noise that is used to correct for local oscillator induced noise on the receiver output signal, as described by the term involving $\epsilon^*_{LO}$ in Eq. (7) is applied in step 304. Correction for local oscillator phase noise can be implemented in signal processing by rotating the complex receiver output signals with the measured laser phase errors. The required sign of the rotation will depend on the hardware configuration and sign convention used. One efficient implementation of such a rotation is a coordinate rotation processor (CORDIC). Additional intensity correction can be implemented through multiplication with a signal that is proportional to the inverse square root of the detected laser intensity signal. The phase and intensity measurements can also be combined into the variable $\epsilon_{LO}(t)$, and the noise on the local oscillator can for instance be suppressed by multiplying the receiver output signal with $1-\epsilon_{LO}(t)$. Finally, in step 306 a pulse compression filter is applied.

Figure 4:
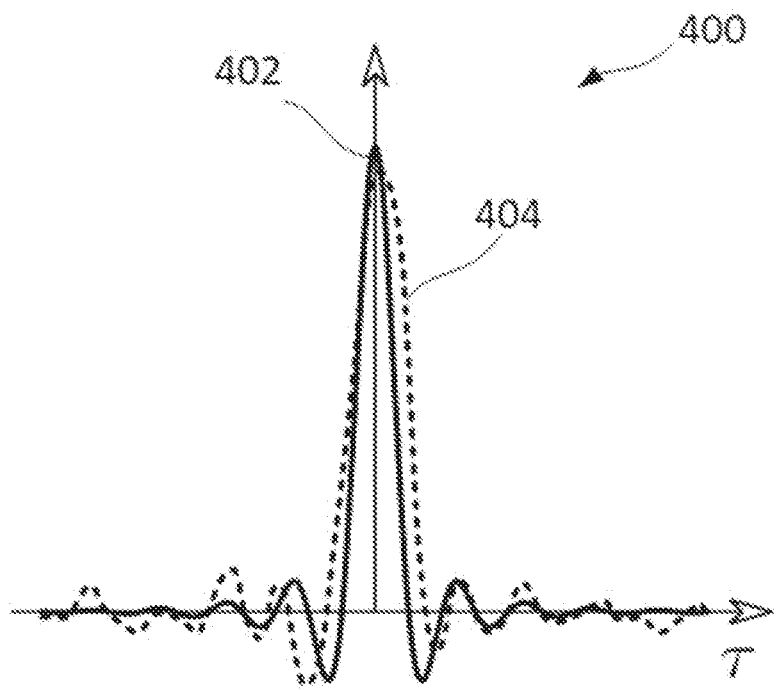
FIG. 4 illustrates aspects of the invention.

FIG. 4 exemplifies the real part of the compressed reference phasor 402, $A(\tau)$, and the compressed interrogation phasor 404, $X_n(\tau)$, obtained from a measurement according to one of embodiments 2A-2D. If the deviations in $M_n(t)$ can be described as a multiplication with a signal of moderate bandwidth, the two compressed phasors will deviate mostly close to zero delay. In the case of the embodiments shown in FIGS. 2C and 2D, the delay range of the deviation in the compressed interrogation phasor that can be measured may be limited by the delay difference between the monitor signal path and the first sensor reflector (the start of the sensor fiber or the first discrete reflector).

In one embodiment of the invention, the pulse compression filter is updated to $C(\tau)=\hat{M}^*_n(\tau)$, where $\hat{M}_n(\tau)$ is the estimate of the interrogation phasor. In another embodiment of the invention a noise suppression filter is calculated and dynamically updated such that the convolution between compressed interrogation phasor and the noise suppression filter approximates the compressed reference phasor in a least square sense. The convolution of the original pulse compression filter and the noise suppression filter combined into an improved pulse compression filter, or the noise suppression filter can be applied to the sampled signal either before or after the primary pulse compression filter.

Figure 5:
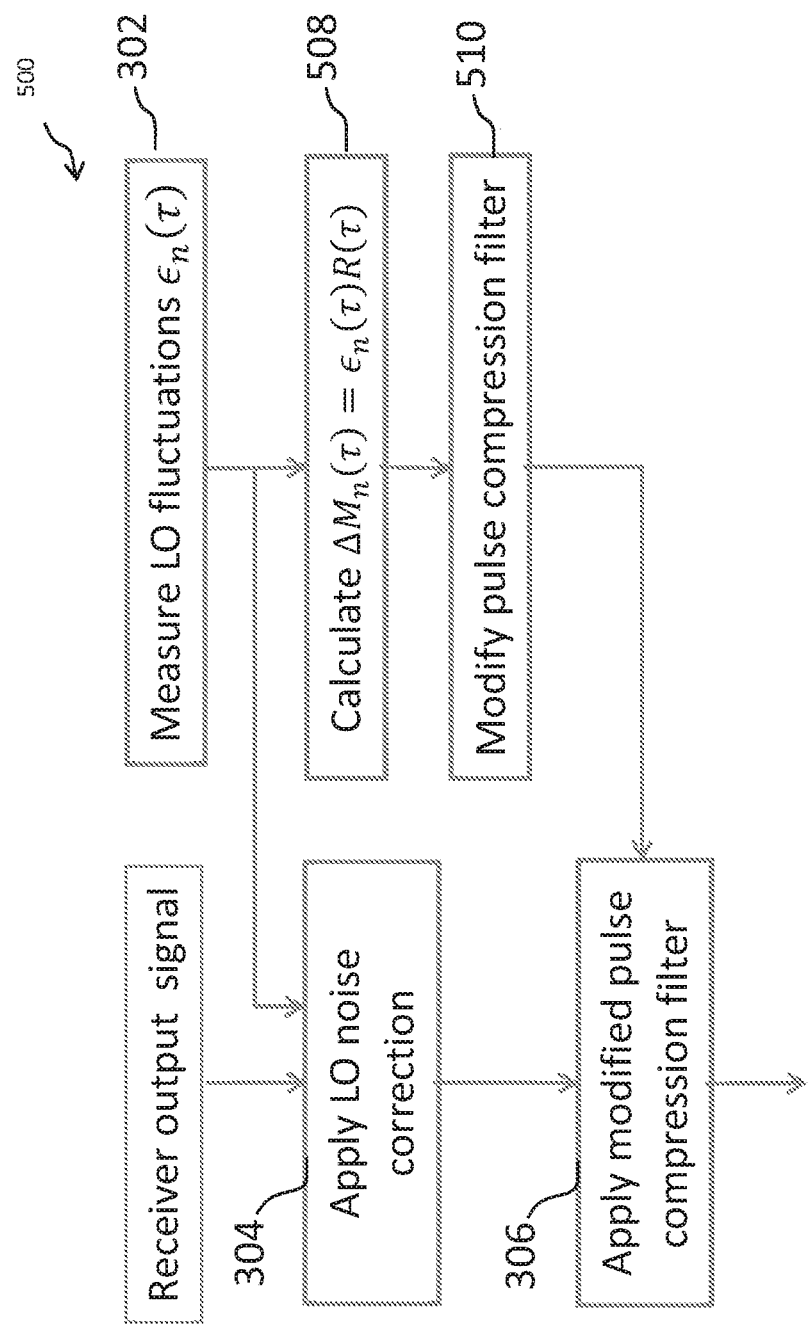
FIG. 5 shows a flow diagram of another embodiment of the method.

FIG. 5, shows one embodiment of the method 500 where the measurement of the laser noise 302 can be further used to reduce the sensitivity to laser noise on the interrogation signal. In step 508, $\Delta M_n(\tau)$ is computed as $\epsilon_n(\tau)R(\tau)$, where $\epsilon_n(\tau)$ comprises the laser phase and/or amplitude noise. This deviation is used to update the pulse compression filter such that $C(\tau)=\hat{M}^*_n(\tau)=R^*(-\tau)+\Delta M^*(\tau)$, and/or to calculate a noise suppression filter $T(\tau)$ based on the deviation of $A(\tau)-\hat{M}_n(\tau)*C(\tau)$ as described in eq. (13). This approach may be useful in cases where laser noise is a dominating contributor to fluctuations in the interrogation phasor. In step 510, the noise suppression filter and the pulse compression filter are combined into a modified pulse compression filter, which is applied to receiver output signal in step 304. However, they may also be applied individually on the receiver output signal.

Figure 6:
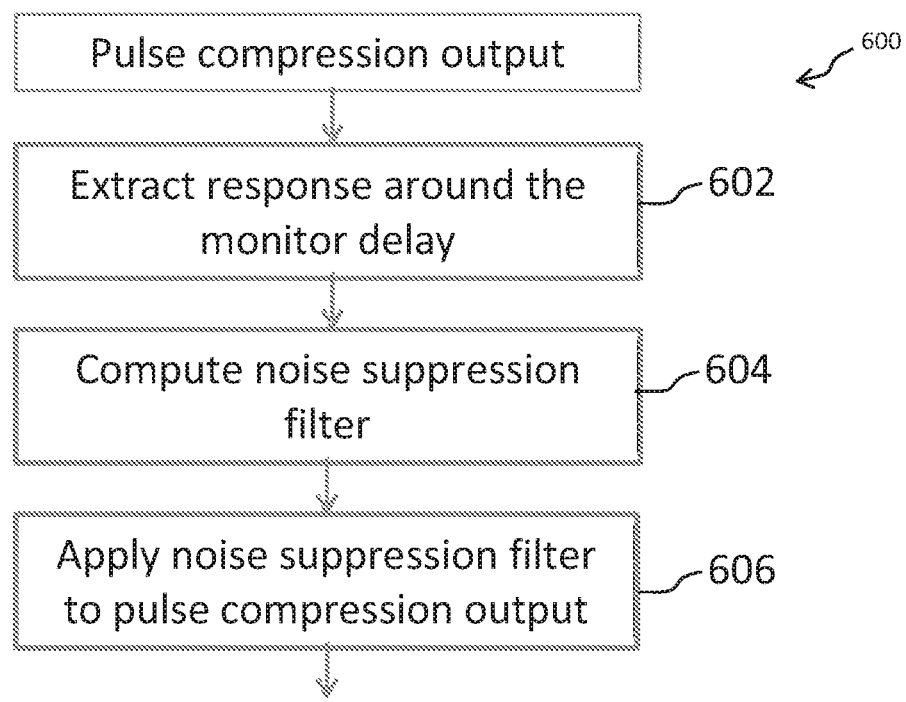
FIGS. 6 and 7 are flow diagrams illustrating details of embodiments of the method according to the invention.

FIG. 6 shows an embodiment of the method 600 which further extends the embodiments of FIG. 3 or FIG. 5. The method extracts and applies a noise suppression filter based on a measurement of the interrogation phasor according to the system of FIG. 2C. In step 602 a delay range of the output from a primary pulse compression filter 306 is extracted which is limited to not overlap with responses from strong sensor reflectors. The extracted signal is compared to the target $A(\tau)$ to obtain the noise suppression filter in step 604 with the methods described above. The noise suppression filter is finally applied in step 606 to the output from the pulse compression filter. This process is repeated for every repetition period. When a swept interrogation pulse is used, the noise suppression filter will correct for multiplicative error contributions to $M_n(t)$ with frequencies up to $SWR \cdot T_d$, where $T_d$ is the delay range that is included in the computation of the compensation filter.

Figure 7:
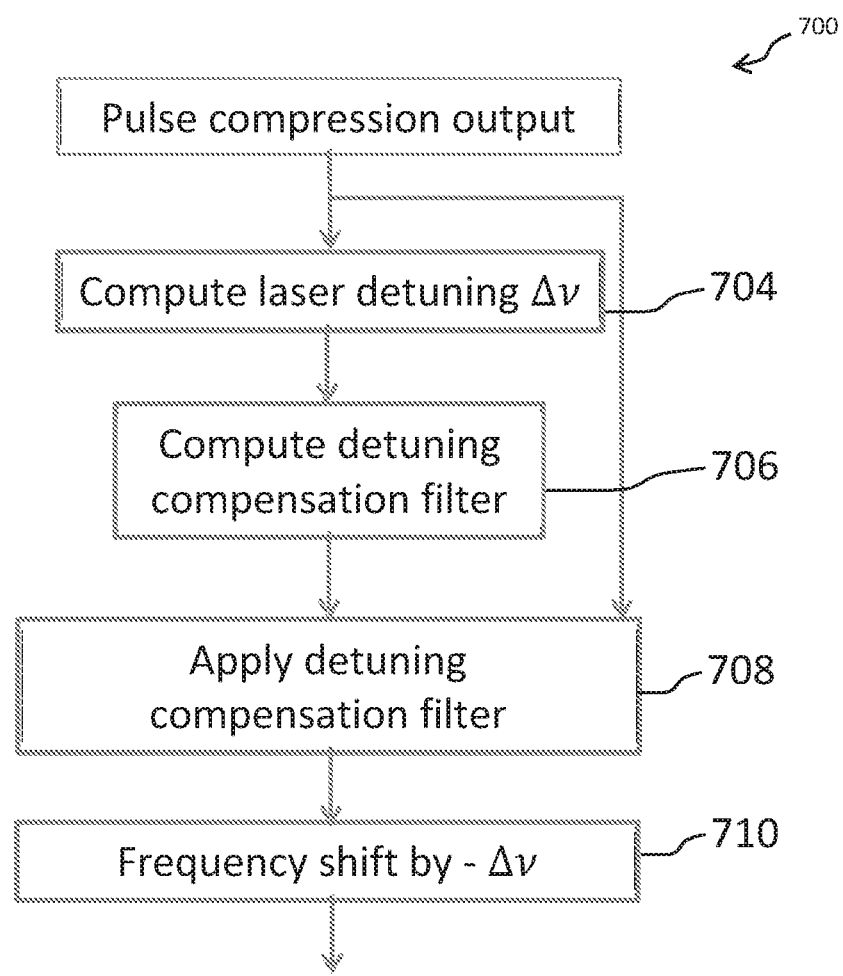

FIG. 7 describes yet another embodiment of the method 700 according to the invention in extension to the embodiments in FIG. 3, FIG. 5 or FIG. 6. A preliminary estimate of the detuning can be calculated as the spatial derivative of the phase of the output from the pulse compression filter, with or without involving the noise suppression techniques described in the previous embodiments. The non-linearity of the detuning estimate can be suppressed by applying Eq. (14) to the pulse compression filter output. This is implemented in this embodiment by first computing a detuning compensation filter 706 based on the laser frequency detuning 704 and the compressed reference phasor $A(\tau)$. The output from the detuning compensation filter 708 is frequency shifted by $\Delta v$. The phase of the frequency shifted signal 710 should be independent of the laser frequency detuning. In some embodiments the first detuning correction is computed based on detuning estimates calculated during previous repetition periods. In some embodiments it may be beneficial to repeat this processing where the detuning output of the first stage is used as the preliminary input to the second stage.

What is claimed is:

1. A method for measuring a response from an optical fiber providing distributed back reflections using a system comprising an optical source comprising a laser, an optical receiver and a processing unit, the method comprising:
generating an interrogation signal and an optical local oscillator using the optical source, the interrogation signal being represented by an interrogation phasor and the optical local oscillator being represented by a local oscillator phasor;
transmitting the interrogation signal into the optical fiber;
mixing the optical local oscillator with reflected light from the optical fiber and detecting a mixing product with the optical receiver to achieve a receiver output signal;
performing a measurement that characterizes fluctuations in the local oscillator phasor;
processing the receiver output signal based on a result of the measurement to provide a corrected receiver output signal such that an effect of fluctuations in the local oscillator phasor on the corrected receiver output signal is reduced;
applying distributed back-reflection processing on the corrected receiver output signal to obtain a distributed back-reflection processing output, wherein applying the distributed back-reflection processing includes extracting, from the optical fiber, information about phase and amplitude of a set of reflectors distributed along the optical fiber; and
extracting the response from the optical fiber from the distributed back-reflection processing output.

2. The method of claim 1, wherein performing the measurement provides an estimated local oscillator phasor, an estimated phase of the local oscillator phasor, and an estimated amplitude of the local oscillator phasor.

3. The method of claim 1, wherein performing the measurement provides an estimated local oscillator phasor, and the receiver output signal is processed by applying a phasor resembling the inverse conjugate of the estimated local oscillator phasor to the receiver output signal.

4. The method of claim 1, wherein performing the measurement provides an estimated phase of the local oscillator phasor, and the receiver output signal is processed by rotating the receiver output signal according to the estimated phase.

5. The method of claim 1, wherein performing the measurement provides an estimated amplitude of the local oscillator phasor, and the receiver output signal is processed by dividing the receiver output signal according to the estimated amplitude.

6. The method of claim 1, wherein a frequency of the interrogation signal is swept.

7. The method of claim 1, wherein the interrogation signal and the optical local oscillator both originate from the laser.

8. The method of claim 1, wherein the interrogation signal and the optical local oscillator both originate from the laser, the method further comprising:
establishing initial parameters of the distributed back-reflection processing;
utilizing the measurement that characterizes fluctuations in the local oscillator phasor to characterize fluctuations in the interrogation phasor; and
updating the parameters of the distributed back-reflection processing based on the result of the measurement such that an effect of fluctuations in the interrogation phasor on the measured response from the optical fiber is reduced.

9. A system for measuring a response from an optical fiber providing distributed back reflections, the system comprising:
an optical source comprising a laser, the optical source being configured for generating an interrogation signal and an optical local oscillator, the interrogation signal being representable by an interrogation phasor, and the optical local oscillator being representable by a local oscillator phasor, the optical source further being configured to transmit the interrogation signal into the optical fiber;
an optical receiver and signal characterization unit configured to generate and receive a mixing product of the optical local oscillator and reflected light from the optical fiber to provide a receiver output signal, and to perform a measurement that characterizes fluctuations in the optical local oscillator; and
a processing unit configured to:
process the receiver output signal based on a result of the measurement to provide a corrected receiver output signal such that an effect of fluctuations in the local oscillator phasor on the corrected receiver output signal is reduced;
apply distributed back-reflection processing on the corrected receiver output signal to obtain a distributed back-reflection processing output, wherein applying the distributed back-reflection processing includes extracting, from the optical fiber, information about phase and amplitude of a set of reflectors distributed along the optical fiber; and
extract the response from the optical fiber from the distributed back-reflection processing output.

10. The system of claim 9, wherein the optical source further comprises a modulator.

11. The system of claim 9, further comprising a separate coherent receiver configured to measure the interrogation signal.

12. The system of claim 9, further comprising a monitor detector configured for measuring fluctuations in the laser phasor characterizing the laser output.

13. The system of claim 12, wherein the monitor detector is configured to provide feedback to the laser of the optical source to minimize the laser phasor fluctuations.

14. The system of claim 12, wherein the monitor detector comprises an intensity detector.

15. The system of claim 12, wherein the monitor detector comprises an interferometer.

16. The system of claim 9, wherein the laser is configured to be the origin of both the interrogation signal and the optical local oscillator.

17. The system of claim 9, wherein the laser is configured to be the origin of both the interrogation signal and the optical local oscillator, and wherein the processing unit is further configured to:
  establish an initial parameter of distributed back-reflection processing;
  use the measurement that characterizes fluctuations in the local oscillator phasor to characterize fluctuations in the interrogation phasor; and
  update the parameters of the distributed back-reflection processing based on the result of the measurement such that an effect of fluctuations in the interrogation phasor on the measured response from the optical fiber is reduced.

* * * * *